(12) United States Patent
Nakashima (10) Patent No.: US 9,529,242 B2
(45) Date of Patent: Dec. 27, 2016

(54) DISPLAY APPARATUS AND DISPLAY APPARATUS MANUFACTURING METHOD

(71) Applicant: SEIKO EPSON CORPORATION, Tokyo (JP)

(72) Inventor: Yoshiki Nakashima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/739,495

(22) Filed: Jun. 15, 2015

(65) Prior Publication Data
US 2015/0370143 A1    Dec. 24, 2015

(30) Foreign Application Priority Data

Jun. 24, 2014   (JP) .................................. 2014-129620

(51) Int. Cl.
| | | |
|---|---|---|
| *G02B 26/00* | (2006.01) | |
| *G02B 26/08* | (2006.01) | |
| *G02F 1/29* | (2006.01) | |
| *G02F 1/167* | (2006.01) | |
| *G02F 1/1333* | (2006.01) | |

(52) U.S. Cl.
CPC ......... *G02F 1/167* (2013.01); *G02F 1/133308* (2013.01); *G02F 2001/133354* (2013.01); *G02F 2001/1672* (2013.01); *G02F 2001/1676* (2013.01); *G02F 2202/28* (2013.01); *Y10T 156/10* (2015.01)

(58) Field of Classification Search
USPC ....... 359/290, 291, 292, 295, 296, 298, 237, 359/24, 245, 246, 247, 265
See application file for complete search history.

(56) References Cited

U.S. PATENT DOCUMENTS

| | | | | |
|---|---|---|---|---|
| 4,916,511 A | * | 4/1990 | Douglas | .............. H01L 21/3065 257/301 |
| 2010/0065850 A1 | * | 3/2010 | Kwak | ............... G02F 1/136227 257/72 |

FOREIGN PATENT DOCUMENTS

| | | | | |
|---|---|---|---|---|
| JP | 2004-157237 | * | 5/2002 | ............. G02F 1/167 |
| JP | 2004-157237 A | | 6/2004 | |
| JP | 2010-204376 A | | 9/2010 | |
| JP | 2011-221125 A | | 11/2011 | |

* cited by examiner

*Primary Examiner* — Joseph P Martinez
*Assistant Examiner* — Brandi Thomas
(74) *Attorney, Agent, or Firm* — Global IP Counselors, LLP (57) ABSTRACT

A display apparatus and a display apparatus manufacturing method are provided with which a favorable display quality can be obtained by preventing an air bubble from entering. The display apparatus in the invention includes a circuit board including a display portion and a peripheral circuit portion provided at the periphery of the display portion, a display sheet layer, an adhesion layer that adheres the display sheet to the circuit board, and a common electrode that is provided on the display sheet and can apply a voltage to the display sheet between the common electrode and the pixel electrode. A surface of the circuit board to which the display sheet is adhered through the adhesion layer has a recess-and-projection structure including recess portions and projecting portions. The recess-and-projection structure is formed so as to reach an outer edge of the peripheral circuit portion, as viewed in a plan view.

10 Claims, 9 Drawing Sheets

DISPLAY APPARATUS AND DISPLAY APPARATUS MANUFACTURING METHOD

BACKGROUND

1. Technical Field

This application claims a priority to Japanese Patent Application No. 2014-129620 filed on Jun. 24, 2014 which is hereby expressly incorporated by reference in its entirety.

Several aspects of the present invention relates to a display apparatus and a display apparatus manufacturing method.

2. Related Art

Heretofore, an electrophoretic display apparatus, in which a circuit board having a pixel electrode formed on a circuit constituted by a switching element or the like is adhered to an electrophoretic layer via an adhesion layer, is known as a display apparatus (e.g., see JPA-2011-221125). When manufacturing this kind of electrophoretic display apparatus, in general, an electrophoretic sheet (display sheet) having a sheet shape is formed by being adhered to the circuit board using an adhesive.

However, in the above-described electrophoretic display apparatus, when the electrophoretic sheet is adhered via the adhesion layer, an air bubble may possibly enter between the circuit board and the adhesion layer as a result of catching gas generated from an adhesive containing a small amount of solvent components or air at the time of adhesion, since the upper surface of the circuit board is a flat surface. To solve this, a technique is known for removing the air bubble at the time of adhesion by forming the adhesion layer in a shape with recesses and projections (e.g., see JP-A-2010-204376).

However, in the aforementioned known technique, since recesses and projections are formed on the adhesion layer, the recesses and projections undergo deformation as a result of the adhesion layer flowing at the time of heat treatment before the adhesion, and it is difficult to sufficiently discharge the air bubble. If the air bubble remains within the display portion, there is a possibility that a predetermined voltage is not applied to an electrophoretic layer and a failure in display occurs.

SUMMARY

One aspect of the invention has been made in order to solve the aforementioned problem, and an object thereof is to provide a display apparatus and a display apparatus manufacturing method with which a favorable display quality can be obtained by preventing an air bubble from entering.

According to a first aspect of the invention, a display apparatus includes a circuit board including a display portion and a peripheral circuit portion provided at the periphery of the display portion, a display sheet layer, an adhesion layer that adheres the display sheet to the circuit board, and a common electrode that is provided on the display sheet and can apply a voltage to the display sheet between the common electrode and the pixel electrode. A surface of the circuit board adhered via the adhesion layer has a recess-and-projection structure including recess portions and projecting portions. The recess-and-projection structure is formed so as to reach an outer edge of the peripheral circuit portion, as viewed in a plan view.

With the display apparatus according to the first aspect, an air bubble generated when adhering the display sheet to the circuit board is reliably discharged to the outside of the display portion and the peripheral circuit portion along the recess portions of the recess-and-projection structure. Accordingly, since an air bubble is prevented from entering the inside of the adhesion layer, a decrease in the adhesiveness due to entering of an air bubble is prevented. Furthermore, since the air bubble is prevented from remaining in the display portion, a favorable display quality can be obtained by a predetermined voltage being applied to the display portion.

In the first aspect, a configuration may be employed in which an area percentage of the projecting portions in the recess-and-projection structure is set to 10 to 90%.

With this configuration, the area percentage of the recesses and projections are optimized, and accordingly a favorable air bubble discharge characteristic can be achieved.

In the first aspect, a configuration may be employed in which a plane shape of the projecting portions of the recess-and-projection structure is one of a stripe shape, a lattice shape, a triangular shape, and a honeycomb shape.

With this configuration, the recess portions extend in a plurality of directions, and accordingly an air bubble can be reliably discharged to the outside of the peripheral circuit portion.

In the first aspect, a configuration may be employed in which a depth of the recess portions of the recess-and-projection structure is set to 0.2 to 3.6 μm.

With this configuration, the depth of the recess portions is optimized. Accordingly, inability to discharge an air bubble as a result of the adhesion layer flowing into the recess portions during heat treatment can be prevented, and the adhesion layer can also be caused to favorably enter the inside of the recess portions at the time of pressure-bonding.

In the first aspect, a configuration may be employed in which the adhesion layer is arranged so as to reach the outside of a region where the recess-and-projection structure is formed.

With this configuration, an outer edge portion of the recess-and-projection structure is covered with the adhesion layer, and the sealing properties of the adhering face can be improved.

In the first aspect, a configuration may be employed in which the adhesion layer is arranged within the region where the recess-and-projection structure is formed.

With this configuration, the adhesion layer is prevented from covering a terminal provided at the outer periphery of the circuit board as a result of spreading over the outside of the recess-and-projection structure. Accordingly, an occurrence of a contact failure caused by the terminal being covered with the adhesion layer can be prevented.

According to a second aspect of the invention, a method is provided for manufacturing a display apparatus including a circuit board including a display portion and a peripheral circuit portion provided at the periphery of the display portion, a display sheet layer, an adhesion layer that adheres the display sheet to the circuit board, and a common electrode that is provided on the display sheet and can apply a voltage to the display sheet between the common electrode and the pixel electrode. In a process of forming the circuit board, a recess-and-projection structure is formed on a surface of the circuit board adhered through the adhesion layer, so as to reach an outer edge of the peripheral circuit portion, as viewed in a plan view.

With the display apparatus manufacturing method according to the second aspect, an air bubble generated when adhering the display sheet to the circuit board can be reliably discharged to the outside of the display portion and the peripheral circuit portion along recess portions of the recess-and-projection structure. Accordingly, the air bubble is prevented from entering the inside of the adhesion layer, and a decrease in the adhesiveness due to entering of the air bubbles is prevented. Furthermore, since the air bubble is prevented from remaining in the display portion, a display apparatus is provided in which a favorable display quality can be obtained by a predetermined voltage being applied to the display portion.

In the second aspect, a configuration may be employed in which the recess-and-projection structure is formed such that an area percentage of recess portions and projecting portions is 10 to 90%.

With this configuration, the area percentage of the recesses and projections are optimized, and accordingly a favorable air bubble discharge characteristic can be achieved.

In the second aspect, a configuration may be employed in which the recess-and-projection structure is formed such that a plane shape of the projecting portions is one of a stripe shape, a lattice shape, a triangular shape, and a honeycomb shape.

With this configuration, the recess portions extend in a plurality of directions, and accordingly an air bubble can be reliably discharged to the outside of the peripheral circuit portion.

In the second aspect, a configuration may be employed in which the recess-and-projection structure is formed such that a depth of the recess portions is 0.2 to 3.6 μm.

With this configuration, the depth of the recess portions is optimized. accordingly, inability to discharge an air bubble as a result of the adhesion layer flowing into the recess portions during heat treatment can be prevented, and the adhesion layer can also be caused to favorably enter the inside of the recess portions at the time of pressure-bonding.

In the second aspect, a configuration may be employed in which the adhesion layer is arranged so as to reach the outside of a region where the recess-and-projection structure is formed, during an adhering step of adhering the display sheet to the circuit board.

With this configuration, the outer edge portion of the recess-and-projection structure is covered with the adhesion layer, and the sealing properties of the adhering face can thereby be improved.

In the second aspect, a configuration may be employed in which the adhesion layer is arranged within the region where the recess-and-projection structure is formed, during the adhering step of adhering the display sheet to the circuit board.

With this configuration, the adhesion layer is prevented from covering a terminal provided at the outer periphery of the circuit board as a result of spreading over the outside of the recess-and-projection structure. Accordingly, an occurrence of a contact failure caused by the terminal being covered with the adhesion layer can be prevented.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described in detail with reference to the drawings.

Note that, in the drawings used in the following description, a characteristic part is shown in an enlarged manner in some cases for convenience in order to facilitate understanding of the characteristics, and the dimensional ratio or the like of constituent elements are not necessarily the same as in reality.

This embodiment will describe an active-matrix electrophoretic display apparatus as an exemplary display apparatus.

Figure 1:
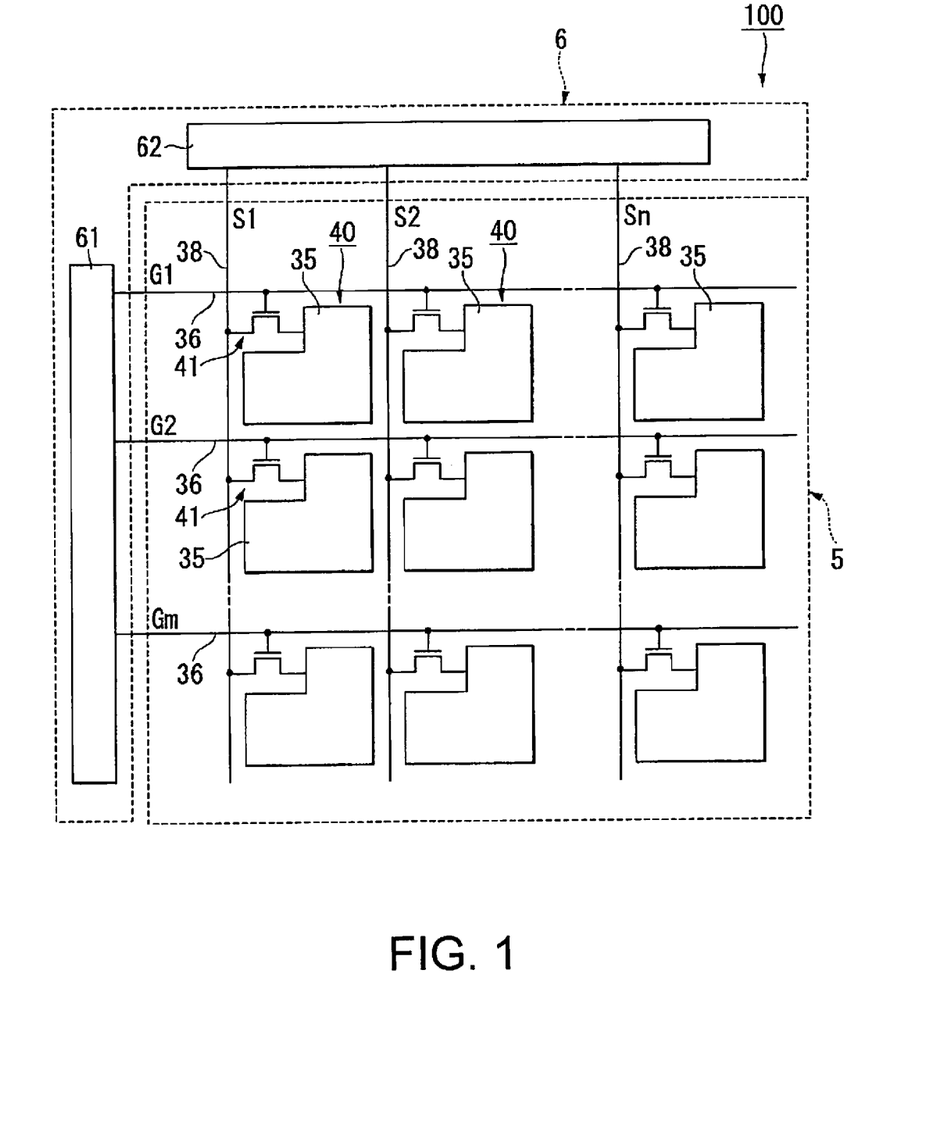
FIG. 1 is an equivalent circuit diagram showing an electrophoretic display apparatus.
Figure 2A:
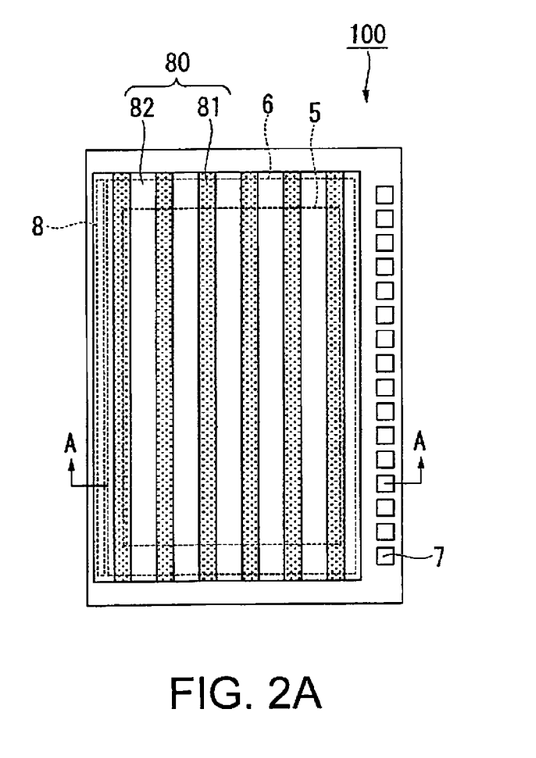
FIGS. 2A and 2B are configuration diagrams of the electrophoretic display apparatus.
Figure 2B:
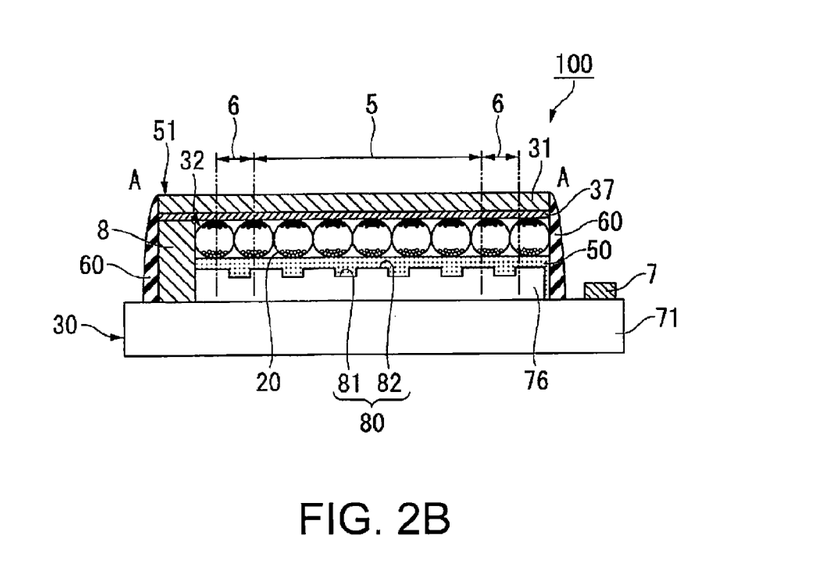

FIG. 1 is an equivalent circuit diagram showing an electrophoretic display apparatus in this embodiment. FIGS. 2A and 2B are diagrams showing a configuration of the electrophoretic display apparatus. FIG. 2A is a configuration plan view, and FIG. 2B is a cross-sectional view taken along arrow A-A in FIG. 2A.

An electrophoretic display apparatus 100 in this embodiment includes a display portion 5 and a peripheral circuit portion 6 provided at the periphery of the display portion 5, as shown in FIG. 1. In the display portion 5, a plurality of pixels 40 are arrayed in matrix in a row direction and a column direction. The peripheral circuit portion 6 includes a scan line drive circuit 61 and a data line drive circuit 62.

The display portion 5 is provided with a plurality of scan lines 36 extending from the scan line drive circuit 61 and a plurality of data lines 38 extending from the data line drive circuit 62, and the pixels 40 are provided so as to correspond to intersecting positions of these lines. Each pixel 40 is provided with a selection transistor 41 and a pixel electrode 35. Note that the "row direction" is the "horizontal direction" in the display portion, and corresponds to the left-right direction in FIG. 1. The "column direction" is the "vertical direction" orthogonal to the horizontal direction, and corresponds to the up-down direction in FIG. 1.

The scan line drive circuit 61 is connected to the pixels 40 via m scan lines 36 (G1, G2, . . . , Gm), sequentially selects the first to $m^{th}$ scan lines 36, and supplies a selection signal that defines a timing of turning on the selection transistors 41 provided in the pixels 40, via the selected scan line 36. The data line drive circuit 62 is connected to the pixels 40 via n data lines 38 (S1, S2, . . . , Sn), and supplies, to each pixel 40, an image signal that defines pixel data corresponding to the pixel 40.

As shown in FIG. 2B, the electrophoretic display apparatus 100 includes an element board 30 (circuit board), a common board 31, an electrophoretic element 32 in which a plurality of microcapsules 20 sandwiched between the element board 30 and the common board 31 are arranged, and external connection terminals 7. The external connection terminals 7 are used for connection to external devices (a power supply device, a computer, etc.).

As shown in FIG. 2A, the size of the element board 30 is larger than the size of the common board 31, as viewed in a plan view. The plurality of external connection terminals 7 are arranged along one of long sides of a board body 71 (see FIG. 3) that constitutes the rectangular element board 30.

The peripheral circuit portion 6 is formed so as to surround the periphery of the display portion 5 like a frame. A conductive member 8 is provided so as to extend along the outside of the peripheral circuit portion 6 and a long side of the element board 30 opposite to the aforementioned external connection terminals 7. The conductive member 8 is for electrically connecting the common electrode 37 provided on the common board 31 to the side of the element board 30, thereby enabling a potential to be supplied to the common electrode 37, and also enabling a predetermined voltage to be applied between the common electrode 37 and the pixel electrodes 35.

In this embodiment, the element board 30 is joined to the common board 31 by the electrophoretic element 32 being adhered to the element board 30 via the adhesion layer 50, as shown in FIG. 2B. In general, the electrophoretic element 32 is formed in advance on the side of the common board 31 and handled as the electrophoretic sheet (display sheet) 51 that includes the adhesion layer 50. In this embodiment, the electrophoretic sheet 51 is constituted by a sheet body including the adhesion layer 50, the electrophoretic element 32, a common electrode 37, and the board body 79.

In a later-described manufacturing process, the electrophoretic sheet 51 is handled in a state where a protection release sheet is adhered to a surface of the adhesion layer 50. The display portion 5 is formed by adhering the electrophoretic sheet 51 from which the release sheet has been removed, to the element board 30 on which the pixel electrode 35, the selection transistors 41, various circuits, and the like are separately formed. For this reason, the adhesion layer 50 exists only on the side of the pixel electrode 35.

The element board 30 includes a plurality of pixel electrodes 35 (see FIG. 3) provided so as to correspond to the pixels 40 (see FIG. 1) in the display portion 5. The pixel electrodes 35 are electrodes that are made of, for example, a transparent conductive material such as ITO (indium tin oxide), a metallic material such as Al, or the like, and apply a voltage to the electrophoretic element 32 between the pixel electrodes 35 and the later-described common electrode 37.

The common board 31 includes a board body 79 and the common electrode 37. The board body 79 is a board made of glass, plastic, or the like, and is a transparent board since it is arranged on a visible side. The common electrode 37 is formed on a surface of the board body 79 on the side of the electrophoretic element 32, so as to face the individual pixel electrodes 35. The common electrode 37 is an electrode that applies a voltage to the electrophoretic element 32 together with the pixel electrodes 35, and is made of a transparent conductive material such as MgAg (magnesium silver), ITO, or IZO (indium zinc oxide).

In this embodiment, a sealing material 60 is provided so as to cover the periphery of the common board 31 and the electrophoretic element 32. The sealing material 60 is for preventing moisture or the like from entering by sealing the inside (the display portion 5 and the peripheral circuit portion 6) in the electrophoretic display apparatus 100.

Figure 3A:
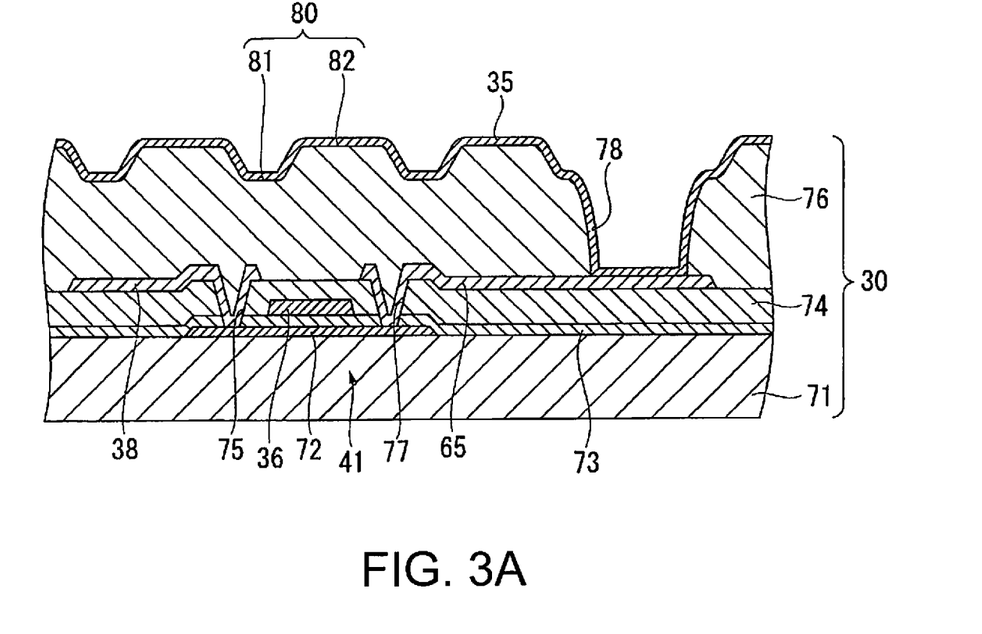
FIGS. 3A and 3B are cross-sectional views showing a main configuration of an element board.
Figure 3B:
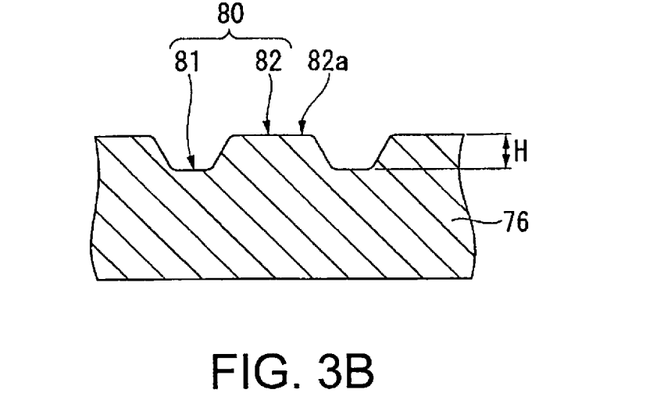

Subsequently, a configuration of the element board 30 will be described in detail. FIGS. 3A and 3B are cross-sectional views showing a main configuration of the element board 30. Note that FIG. 3B omits the pixel electrodes 35.

As shown in FIG. 5A, the scan lines 36, the data lines 38, the selection transistors 41, and the like shown in FIG. 1 are formed on a face on the side where the electrophoretic element 32 of the element board 30 is arranged.

The board body 71 constituting the element board 30 is made of glass, plastic, or the like. This board body 71 does not have to be transparent since it is arranged on the side opposite to the viewed side. A semiconductor layer 72 is formed on a surface of the board body 71 on the side of the electrophoretic element 32, and a gate insulating film 73 is formed so as to cover the semiconductor layer 72. The semiconductor layer 72 may be, for example, a non-single-crystal silicon material such as amorphous silicon or polycrystalline silicon, an oxide semiconductor material, a transparent oxide semiconductor material such as In—Ga—Zn—O, an organic semiconductor material such as a fluorine-bithiophene copolymer, or the like. When using an oxide semiconductor material as the semiconductor layer 72, it is desirable to also use an oxide insulating material as the gate insulating film 73. When using an organic semiconductor material as the semiconductor layer 72, it is desirable to also use an organic insulating material as the gate insulating film 73.

The scan lines 36 functioning as gate electrodes of the selection transistors 41 are formed on the gate insulating film 73. The scan line 36 may be, for example, a metallic multi-layer film of an Al—Nd alloy and Mo or the like. In other cases, Al element, ITO, Cu Cr, Ta, Mo, Nb, Ag, Pt, Pd, In, Nd, an alloy thereof, or the like may be used.

A first inter-layer insulating film 74 is formed over the entire board body 71 so as to cover the scan lines 36. The first inter-layer insulating film 74 may be, for example, an inorganic insulating material such as a silicon nitride film, a silicon oxide film, or a silicon nitride oxide film, or an organic insulating material. The data lines 38, each of which electrically connected to a source region of the semiconductor layer 72 via a contact hole 75, are formed on the first inter-layer insulating film 74.

Drain lines (drain electrodes) 65, each of which is electrically connected to a drain region of the semiconductor layer 72 via a contact hole 77, are formed on the first inter-layer insulating film 74. A material similar to that of the scan lines 36 can be used for the data lines 38 and the drain lines 65. Note that, although FIG. 3A shows a top gate structure in which the gate electrode is formed on an upper side in FIG. 3A with respect to the semiconductor layer 72, a bottom gate structure in which the gate electrode is formed below the semiconductor layer 72 may be employed.

A second inter-layer insulating film 76 is formed over the entire first inter-layer insulating film 76 so as to cover the data lines 38 and the drain lines 65. The second inter-layer insulating film 74 may be made of, for example, an inorganic insulating material such as a silicon nitride film, a silicon oxide film, or a silicon nitride oxide film, or an organic insulating material, as with the first inter-layer insulating film 76. The pixel electrodes 35, each of which is electrically connected to the drain region of the semiconductor layer 72 via the drain line 65 and a contact hole 78, are formed on the second inter-layer insulating film 76. Although the plain shape of the pixel electrodes 35 is not shown here, the pixel electrodes 35 are each formed in a substantially rectangular shape in accordance with the arrangement in which the data lines 38 are substantially orthogonal to the scan lines 36.

Incidentally, in the electrophoretic display apparatus 100 in this embodiment, the element board 30 is joined to the common board 31 by the electrophoretic element 32 being adhered to the element board 30 via the adhesion layer 50, as shown in FIG. 2B.

For this reason, it is important in the electrophoretic display apparatus 100 to improve in the adhesiveness of the adhesion layer 50 and prevent an air bubble from entering at the time of adhesion are desired. This is because the mechanical strength decreases if the adhesiveness of the adhesion layer 50 decreases, and the reliability of the apparatus will deteriorate. It is also because the quality of display will decrease if an air bubble enters the inside of the adhesion layer 50.

On the other hand, in the present embodiment, a recess-and-projection structure 80 is formed on the upper surface of the second inter-layer insulating film 76, i.e., the surface thereof to which the electrophoretic sheet 51 is adhered. The recess-and-projection structure 80 includes a recess portion 81 and a projecting portion 82. The pixel electrode 35 has a shape with recesses and projections, which conforms to the shape of the recess-and-projection structure 80.

In this embodiment, the upper surface 82a of each projecting portion 82 is formed so as to be smaller than each pixel electrode 35, as shown in FIG. 3A. Specifically, the area of each upper surface 82a as viewed in a plan view is 20 µm² or larger.

In this embodiment, the recess-and-projection structure 80 has a plane structure in which the recess portions 81 and the projecting portions 82 are formed in a stripe shape, as shown in FIG. 2A. The recess-and-projection structure 80 is formed so as to reach the outer edge of the display portion 5 and the peripheral circuit portion 6, as viewed in a plan view. Specifically, the recess-and-projection structure 80 is formed in a state where the recess portions 81 and the projecting portions 82 are in communication with the outside of the peripheral circuit portion 6.

In this embodiment, the size of the electrophoretic sheet 51 adhered to the element board 30 through the adhesion layer 50 is larger than the size of a region in which the recess-and-projection structure 80 is formed (i.e., the second inter-layer insulating film 76). For this reason, the adhesion layer 50 is in a state of covering a side end face of the second inter-layer insulating film 76, as shown in FIG. 2B. A sealing material 60 seals the display portion 5 and a peripheral circuit portion 6 so as to be in contact with the adhesion layer 50. With this configuration, an outer edge portion of the recess-and-projection structure 80 (the second inter-layer insulating film 76) is covered with the adhesion layer 50 and the sealing material 60, and accordingly high sealing properties can be obtained so as to prevent moisture from entering the inside of the second inter-layer insulating film 76.

The inventor has found through experiments that it is desirable, in the recess-and-projection structure 80, to set the area percentage of the recess portions 81 and the projecting portions 82 to 10 to 90%, and to set the depth of the recess portions 81 to 0.2 to 3.6 µm.

The inventor has conducted an experiment to evaluate whether or not an air bubble was caught when adhering, through the adhesion layer, the electrophoretic sheet to element boards having recess-and-projection structures, while changing the area percentage of the recess portions and the projecting portions by 5% and also changing the depth of the recess portions by 0.2 µm.

Figure 4A:
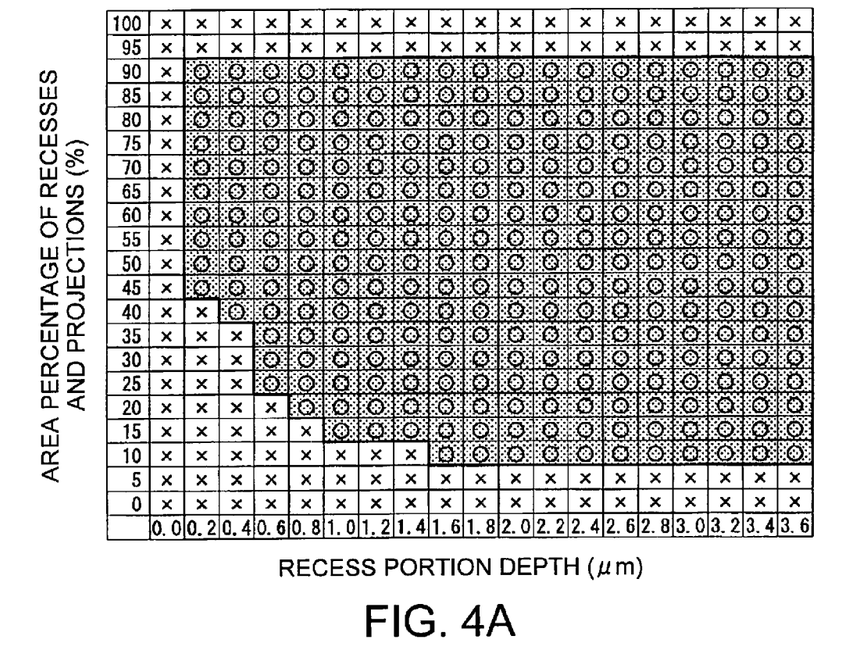
FIGS. 4A and 4B are tables showing experiment results relating to a recess-and-projection structure.
Figure 4B:
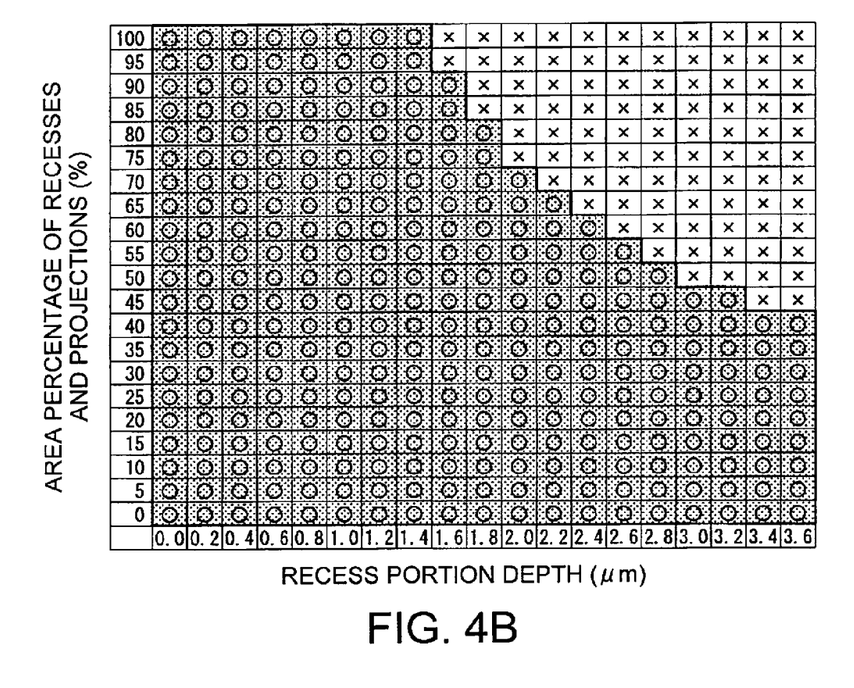
Figure 5:
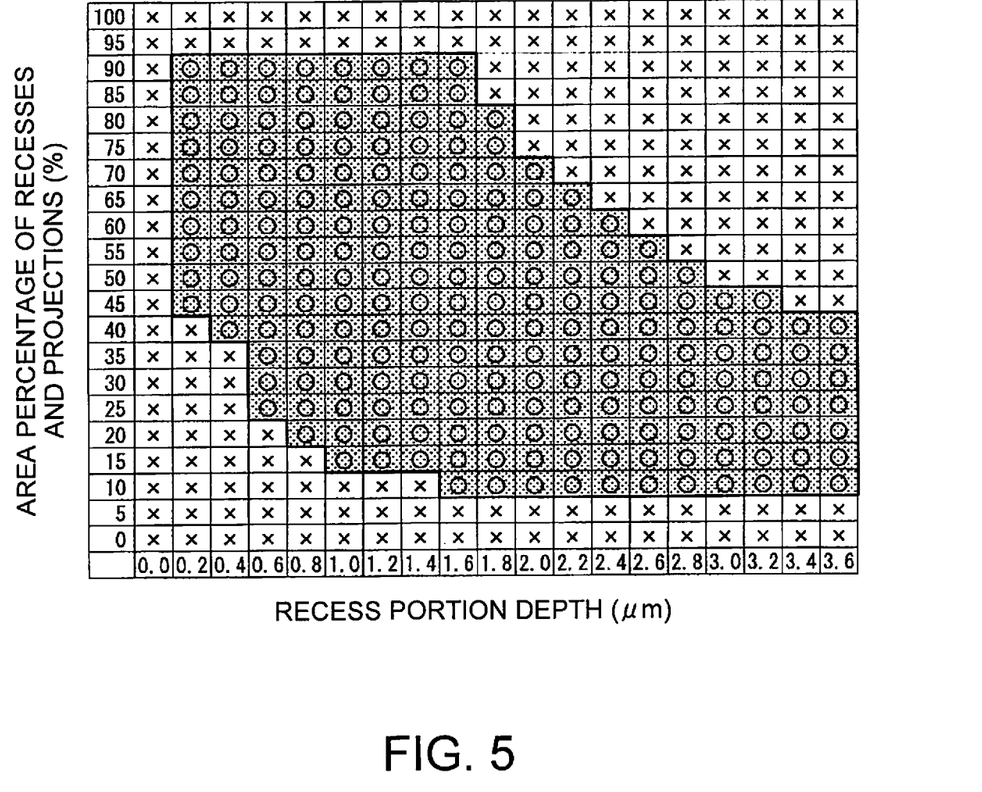
FIG. 5 is a table showing an experiment result relating to the recess-and-projection structure.

FIGS. 4A, 4B, and 5 are tables showing results of this experiment. FIG. 4A shows a result of the evaluation regarding whether or not an air bubble is caught after installing (without pressure-bonding) the electrophoretic sheet on the element board. FIG. 4B shows a result of evaluation regarding whether or not an air bubble is caught after pressure-bonding the electrophoretic sheet to the element board. Note that, in the evaluation result in FIGS. 4A and 4B, a case where catching of an air bubble was found (i.e., an air bubble was present) is indicated as "x" (not), and a case where catching of an air bubble was not found (i.e., an air bubble was not present) is indicated as "○" (good). In FIG. 5, results that were "○" (good) in both evaluations in FIGS. 4A and 4B were extracted.

Note that, in FIGS. 4A, 4B, and 5, the vertical column indicates the area percentage (unit: %) of the recess portions and the projecting portions. That is to say, in the vertical column, the case where the area percentage is 100% means the case where the recess-and-projection structure is constituted only by the projecting portions (i.e., a configuration with no recess portions). Also, in the vertical column, the case where the area percentage is 0% means the case where the recess-and-projection structure is constituted only by the recess portions (i.e., a configuration with no projecting portions). The horizontal column indicates the depth of the recess portions (unit: µm).

According to the experiment results shown in FIGS. 4A, 4B, and 5, it was found that an air bubble can be prevented from being caught into the adhesion layer, by setting the area percentage of the recess portions and the projecting portions to 10 to 90%. It was also found that an air bubble can be prevented from being caught into the adhesion layer, by setting the depth H of the recess portions 81 to 0.2 to 3.6 µm.

In this embodiment, the depth H of the recess portions 81 in the recess-and-projection structure 80 is set to 0.2 to 3.6 µm, based on the above experiment results (see FIG. 3B). Also, in the recess-and-projection structure 80, the area percentage of the recess portions 81 and the projecting portions 82 is set to 10 to 90%.

Figure 6A:
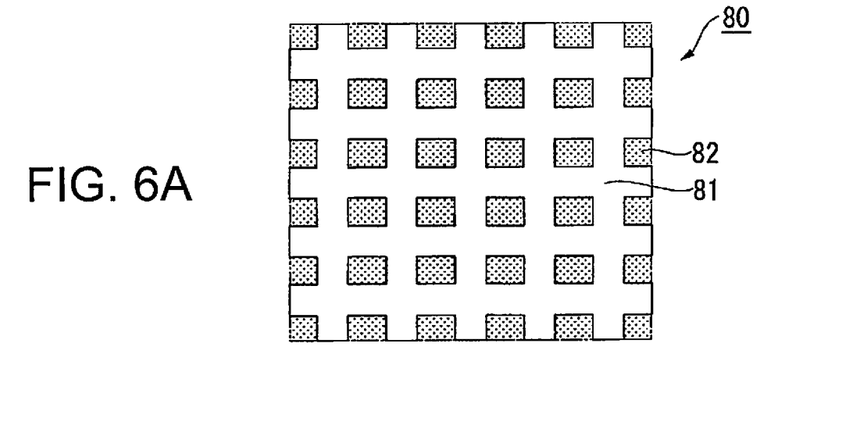
FIGS. 6A to 6C are diagrams showing plane structures of the recess-and-projection structure according to modifications.
Figure 6B:
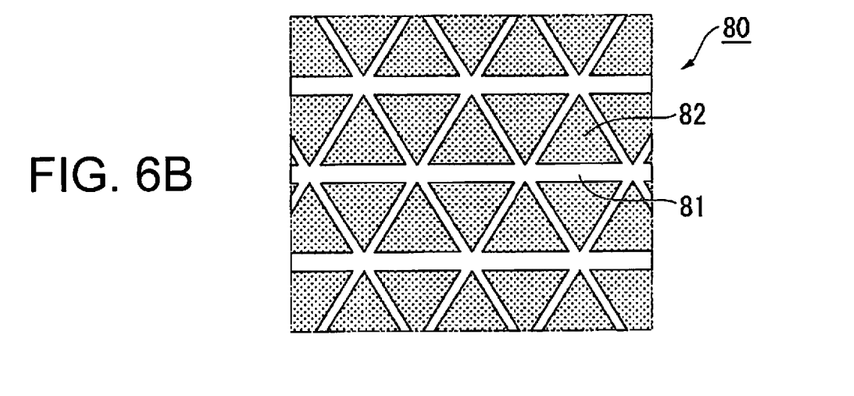
Figure 6C:
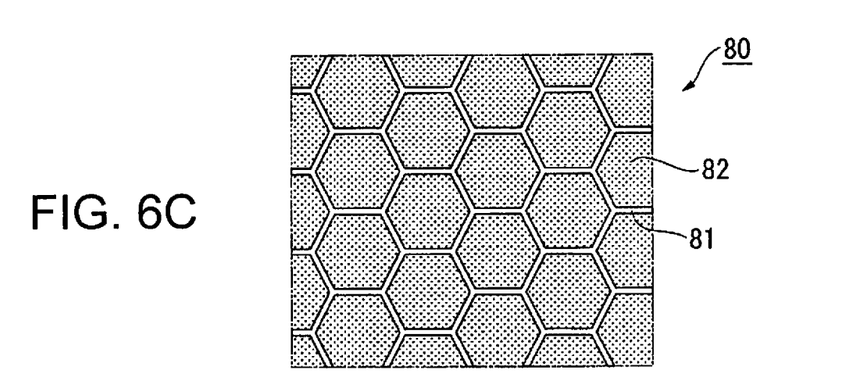

Note that this embodiment has described the plane structure of the recess-and-projection structure 80 in which the recess portions 81 and the projecting portions 82 are arranged in a stripe shape, as shown in FIG. 2A. However, the plane structure of the recess-and-projection structure 80 is not limited thereto. FIGS. 6A to 6C are diagrams showing configurations of the plane structure of the recess-and-projection structure 80 according to modifications.

In the recess-and-projection structure 80, the projecting portions 82 may have a lattice-like plane shape as shown in FIG. 6A. In this case as well, the recess portions 81 are formed in a state of being in communication with the outside of the peripheral circuit portion 6, as described above.

Also, in the recess-and-projection structure 80, the projecting portions 82 may have a triangular lattice shape, as shown in FIG. 6B. In this case as well, the recess portions 81 are formed in a state of being in communication with the outside of the peripheral circuit portion 6, as described above.

Also, in the recess-and-projection structure 80, the projecting portions 82 may have a honeycomb (hexagonal) plane shape, as shown in FIG. 6C. In this case as well, the recess portions 81 are formed in a state of being in communication with the outside of the peripheral circuit portion 6, as described above.

The projecting portions 82 of the recess-and-projection structure 80 may have a plane shape other than the lattice shape, the triangular lattice shape, and the honeycomb (hexagonal) shape. The recess portions 81 need only be formed in a state of being in communication with the outside of the peripheral circuit portion 6.

Figure 7:
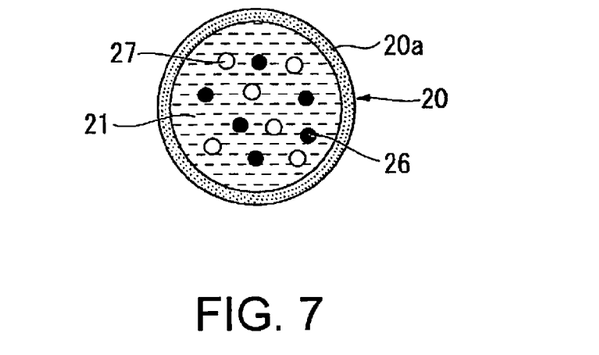
FIG. 7 is a cross-sectional view of a microcapsule that constitutes an electrophoretic element.
Figure 8A:
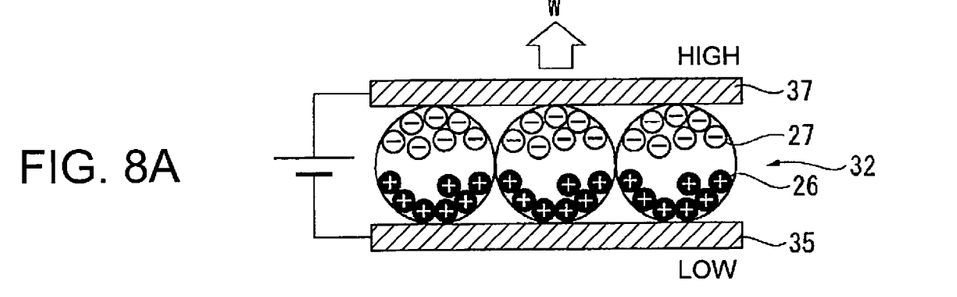
FIGS. 8A and 8B are diagrams for illustrating operations of the electrophoretic element.
Figure 8B:
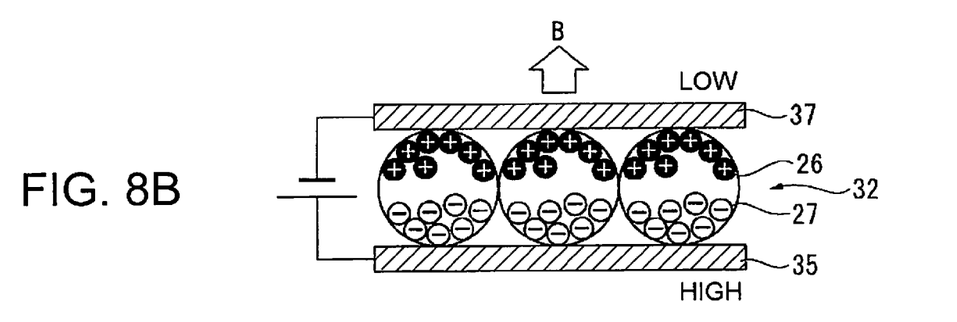

FIG. 7 is a cross-sectional view of a microcapsule that constitutes the electrophoretic element 32. FIGS. 8A and 8B are diagrams for illustrating operations of the electrophoretic element.

As shown in FIG. 7, each microcapsule 20 is a spherical body that has a particle diameter of about 50 μm, for example, and within which a dispersing medium 21, a large number of white particles (electrophoretic particles) 27, and a large number of black particles (electrophoretic particles) 26 are encapsulated. The microcapsules 20 are sandwiched between the common electrode 37 and the pixel electrodes 35 as shown in FIG. 7, and a plurality of microcapsules 20 are arranged within one pixel 40. Note that, although FIG. 7 shows a configuration in which a plurality of microcapsules 20 are arranged within one pixel 40, a configuration is also possible in which one microcapsule 20 is arranged within one pixel 40.

An outer shell portion 20*a* (wall film) of each microcapsule 20 is made of acrylic resin such as polymethyl methacrylate or polyethyl methacrylate, translucent high polymer resin such as urea resin or gum arabic, or the like. The dispersing medium 21 is a liquid that disperses the white particles 27 and the black particles 26 within each microcapsule 20.

Examples of the dispersing medium 21 include water, an alcoholic solvent (methanol, ethanol, isopropanol, butanol, octanol, methyl cellosolve, etc.), ester (acetic ester, acetic butyl, etc.), ketone (acetone, methyl ethyl ketone, methyl isobutyl ketone, etc.), aliphatic hydrocarbon (pentane, hexane, octane, etc.), alicyclic hydrocarbon (cyclohexane, methyl cyclohexane, etc.), aromatic hydrocarbon (benzene, toluene, benzene having long chain alkyl group (xylene, hexylbenzene, heptylbenzene, octylbenzene, nonylbenzene, decylbenzene, undecylbenzene, dodecylbenzene, tridecylbenzene, tetradecylbenzene, etc.)), halogenated hydrocarbon (methylene chloride, chloroform, carbon tetrachloride, 1,2-dichloroethane, etc.), carboxylate, and the like, and may also be other oils. These materials can be used independently or as a mixture, and a surfactant or the like may further be combined therewith.

The white particles 27 are particles (high polymers or colloid) made of white pigment such as titanium dioxide, zinc white, antimony trioxide, or the like, for example, and are used while being negatively charged, for example. The black particles 26 are particles (high polymers or colloid) made of black pigment such as aniline black or carbon black, for example, and is used while being positively charged, for example.

To these white pigment and black pigment, a charge control agent made of particles of an electrolyte, a surfactant, metallic soap, resin, gum, oil, varnish, a compound, or the like, a dispersant such as a titanium coupling agent, an aluminum coupling agent, or a silane coupling agent, a lubricant, a stabilizer, or the like can be added as necessary.

In place of the black particles 26 and the white particles 27, for example, pigment of red, green, blue, yellow, cyan, magenta, or the like may be used. With this configuration, red, green, blue, yellow, cyan, magenta, or the like can be displayed on the display portion 5 without using a color filter. Note that, in place of the above configuration, a one-particle system may be used in which one type of charged particles is dispersed in a colored dispersing medium 21. Alternatively, a configuration may also be employed in which two or more types of charged particles are dispersed in a colored dispersing medium 21.

In place of the configuration in which the dispersing medium and the particles are encapsulated in the microcapsules, a configuration may also be employed in which the dispersing medium and the particles are loaded between the pair of boards. In this case, a partition may be provided between the pair of boards, and the dispersing medium and the particles may be loaded within cells demarcated by the partition.

When the pixels 40 are displayed in white in the electrophoretic element 32 having the above configuration, as shown in FIG. 8A, the common electrode 37 is held at a relatively high potential, and the pixel electrodes 35 are held at a relatively low potential. That is to say, with the potential of the common electrode 37 as a reference potential, the pixel electrodes 35 are held at a negative polarity. The negatively charged white particles 27 are thereby drawn to the common electrode 37, while the positively charged black particles 26 are drawn to the pixel electrodes 35. As a result, when these pixels are seen from the side of the common electrode 37, white color is visually recognized.

On the other hand, when the pixels 40 are displayed in black, as shown in FIG. 8B, the common electrode 37 is held at a relatively low potential, and the pixel electrodes 35 are held at a relatively high potential. That is to say, with the potential of the common electrode 37 as a reference potential, the pixel electrodes 35 are held at a positive polarity. The positively charged black particles 26 are thereby drawn to the common electrode 37, while the negatively charged white particles 27 are drawn to the pixel electrodes 35. As a result, when these pixels are seen from the side of the common electrode 37, black color is visually recognized.

Figure 9A:
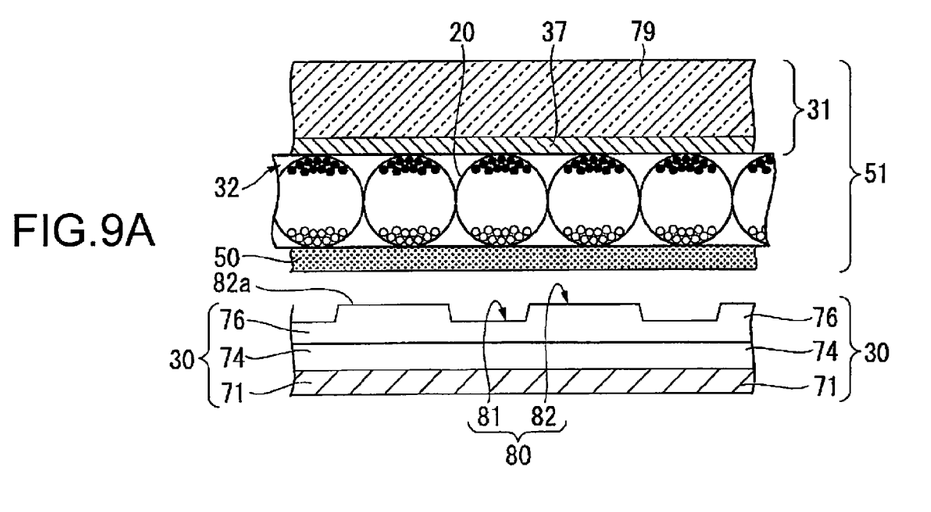
FIGS. 9A to 9C are diagrams showing exemplary processes of manufacturing the electrophoretic display apparatus.
Figure 9B:
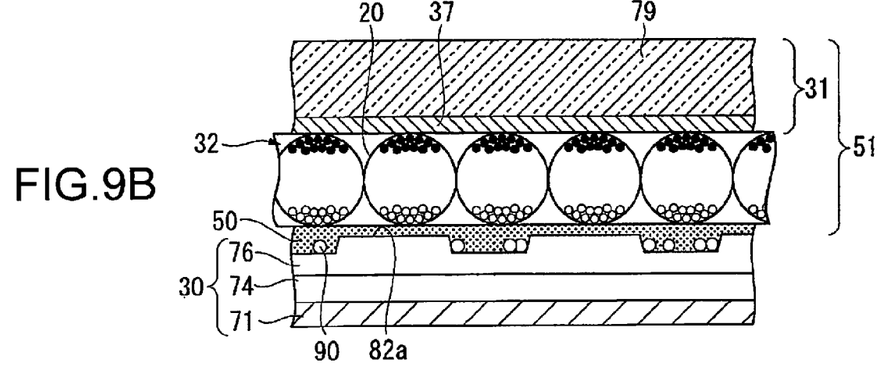
Figure 9C:
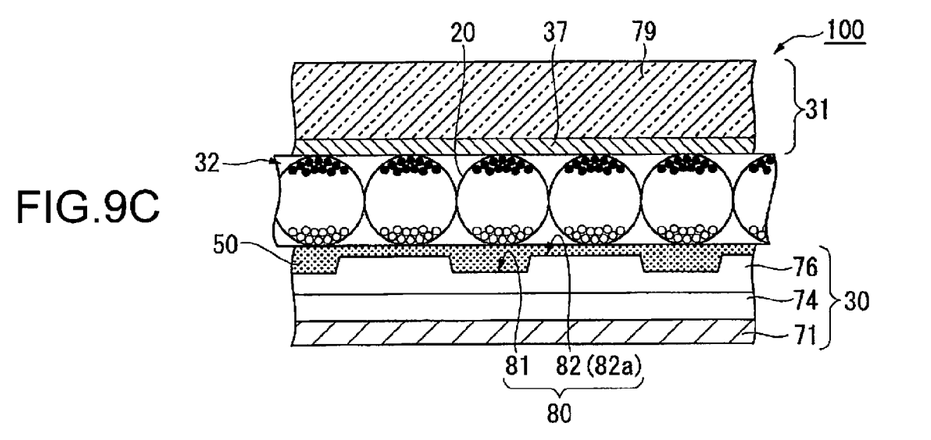

Subsequently, a method for manufacturing the electrophoretic display apparatus 100 having the above-described configuration will be described, and an effect of the above-described recess-and-projection structure 80 will also be described. FIGS. 9A to 9C are diagrams showing exemplary processes of manufacturing the electrophoretic display apparatus 100. Note that FIGS. 9A to 9C simplify the structure of the element board 30 and omit the pixel electrodes 35. FIGS. 9A to 9C also simplify the structure of the common board 31 and omit the common electrode 37.

Initially, the element board 30 including the pixel electrodes 35, the selection transistors 41, and various circuits is formed. The process of forming the element board 30 includes a step of forming the above-described recess-and-projection structure 80. For example, the recess-and-projection structure 80 is formed by adjusting the amount of exposure or the like when forming the second inter-layer insulating film 76 using a photolithography method.

Subsequently, the electrophoretic sheet 51 in a state where the protection release sheet is adhered to the surface of the adhesion layer 50 is prepared. Then, as shown in FIG. 9A, the electrophoretic sheet 51 from which the release sheet has been removed is adhered to the element board 30. The adhering of the electrophoretic sheet 51 and the element board 30 is performed by pressing them against each other in a state of being heated at a predetermined temperature.

Here, when adhering the electrophoretic sheet 51, air bubbles are generated between the adhesion layer 50 and the element board 30. When the electrophoretic sheet 51 is adhered to the element board 30 and the adhesion layer 50 comes into contact with the projecting portions 82 of the recess-and-projection structure 80, air bubbles 90 pressed out from the adhesion layer 50 and the projecting portion 82 flow into the recess portions 81, as shown in FIG. 9B.

The adhesion layer 50 enters the inside of the recess portion 81 by further pressing the electrophoretic sheet 51. In this embodiment, since the recess portions 81 are formed in a state of being in communication with the outside of the peripheral circuit portion 6 as shown in FIG. 2A, the air bubbles 90 that have flown into the recess portion 81 are reliably discharged to an external region.

Furthermore, in this embodiment, the size of the electrophoretic sheet 51 adhered to the element board 30 through the adhesion layer 50 is larger than the size of the adhering face in the region (the second inter-layer insulating film 76) in which the recess-and-projection structure 80 is formed (see FIG. 2B). For this reason, the adhesion layer 50 whose viscosity has decreased due to being heated is in a state of covering a side end face of the second inter-layer insulating film 76.

Ultimately, as shown in FIG. 9C, the electrophoretic element 32 is adhered to the element board 30 via the adhesion layer 50. Then, as shown in FIG. 2B, the common board 31 and the electrophoretic element 32 are sealed by the sealing material 60 so as to be covered therewith at the periphery, and the electrophoretic display apparatus 100 is thereby manufactured in which the element board 30 is joined to the common board 31.

According to this embodiment, the air bubbles 90 generated when adhering the electrophoretic sheet 51 to the element board 30 can be favorably discharged to the outside by favorably pressing the air bubbles 90 into the recess portions 81 using the upper surfaces 82a of the projecting portions 82. Accordingly, the air bubbles 90 are prevented from entering the inside of the adhesion layer 50, and therefore a decrease in the adhesiveness due to entering of the air bubbles 90 is prevented.

Furthermore, in the recess-and-projection structure 80 in this embodiment, the area percentage of the recess portions 81 and the projecting portions 82 is set to 10 to 90%. Accordingly, the area percentage of the recesses and projections is optimized, and a favorable air bubble discharge characteristic can thereby be achieved.

Furthermore, the depth of the recess portions 81 is set to 0.2 to 3.6 μm and is thereby optimized. Accordingly, inability to discharge the air bubbles 90 due to the adhesion layer 50 flowing into the recess portions 81 during heat treatment can be prevented, and the adhesion layer 50 can also be caused to favorably enter the inside of the recess portions 81 at the time of pressure-bonding.

In this embodiment, an outer edge portion of the recess-and-projection structure 80 (the second inter-layer insulating film 76) is covered with the adhesion layer 50 and the sealing material 60. Accordingly, the electrophoretic display apparatus 100 having high sealing properties can be provided.

Note that the technical scope of the invention is not limited to the above-described embodiment, and can be modified in various manners within the scope without departing from the gist of the invention.

Figure 10:
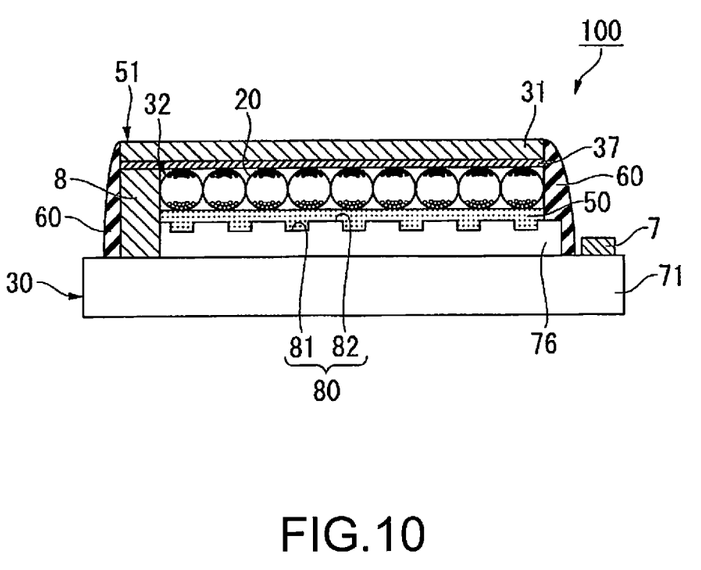
FIG. 10 is a cross-sectional view showing a configuration of an electrophoretic display apparatus according to a modification.

For example, the above embodiment has described an exemplary case where the size of the electrophoretic sheet 51 is larger than the size of the region (the second inter-layer insulating film 76) where the recess-and-projection structure 80 is formed (see FIG. 2B). However, the invention is not limited thereto. For example, the size of the electrophoretic sheet 51 may be smaller than the size of the region (the second inter-layer insulating film 76) where the recess-and-projection structure 80 is formed. In this case, as shown in FIG. 10, the adhesion layer 50 is in a state of not covering the side end face of the second inter-layer insulating film 76.

For this reason, when adhering the electrophoretic sheet 51, it is possible to reliably prevent an occurrence of a malfunction such as a contact failure due to the adhesion layer 50 with a decreased viscosity as a result of being heated covering the external connection terminals 7.

Although the above embodiment has described, as an example of a display apparatus, the electrophoretic display apparatus 100 in which the element board 30 is adhered to the electrophoretic sheet 51 via the adhesion layer 50, the invention is not limited thereto. That is to say, the invention is also applicable to, for example, a liquid crystal display apparatus or an organic electroluminescence apparatus in which a display sheet adhered via an adhesion layer includes a liquid crystal layer or an organic electroluminescence element.

What is claimed is:

1. A display apparatus comprising:
   a circuit board having a display portion region and a peripheral region that is the outside of the display portion region;
   a display sheet adhered to at least the display portion region of the circuit board, the display sheet including
   an adhesion layer having a recess-and-projection surface adhered to a surface of the circuit board, and a flat surface opposite the recess-and-projection surface,
   an electrophoretic element layer having a first surface attached to the flat surface and a second surface opposite the first surface, and
   a common electrode attached to the second surface,
   the surface of the circuit board to which the recess-and-projection surface of the adhesion layer is adhered having a recess-and-projection structure having a plurality of recess portions, and
   the recess-and-projection structure being arranged so as to be continuous with at least a part of the display portion region and the peripheral region.

2. The display apparatus according to claim 1,
   wherein, in an area where the recess-and-projection structure is formed, an area percentage of a portion of the recess-and-projection structure other than the recess portions is set to 10 to 90%.

3. The display apparatus according to claim 1,
   wherein a plane shape of a portion of the recess-and-projection structure other than the recess portions is one of a stripe shape, a lattice shape, a triangular shape, and a honeycomb shape.

4. The display apparatus according to claim 1,
   wherein a depth of the recess portions of the recess-and-projection structure is set to 0.2 to 3.6 μm.

5. The display apparatus according to claim 1,
   wherein the adhesion layer is arranged so as to reach the outside of a region where the recess-and-projection structure is formed.

6. A display apparatus manufacturing method comprising:
   forming a pixel circuit and a peripheral circuit on a circuit board;
   forming an insulating film having a recess portion continuous with at least a part of the pixel circuit and the peripheral circuit;
   forming a display sheet having a flat adhesion layer; and
   adhering the flat adhesion layer of the display sheet to the recess portion of the insulating film on the pixel circuit.

7. The display apparatus manufacturing method according to claim 6,
   wherein an area percentage of a portion other than the recess portion in a region where the recess portion is formed is 10 to 90%.

8. The display apparatus manufacturing method according to claim 6,
   wherein the recess-and-projection structure is formed such that a plane shape of a portion other than the recess portion in a region where the recess portion is formed is one of a stripe shape, a lattice shape, a triangular shape, and a honeycomb shape.

9. The display apparatus manufacturing method according to claim 6,
   wherein the recess portion is formed so as to have a depth of 0.2 to 3.6 μm.

10. The display apparatus manufacturing method according to claim 6,
    wherein the forming and the adhering includes forming and adhering the flat adhesion layer such that the flat adhesion layer is arranged so as to reach the outside of a region where the recess portion is formed.

* * * * *